F. K. LANDGRAF.
STAY BOLT STRUCTURE.
APPLICATION FILED JULY 2, 1919.
1,410,480.
Patented Mar. 21, 1922.
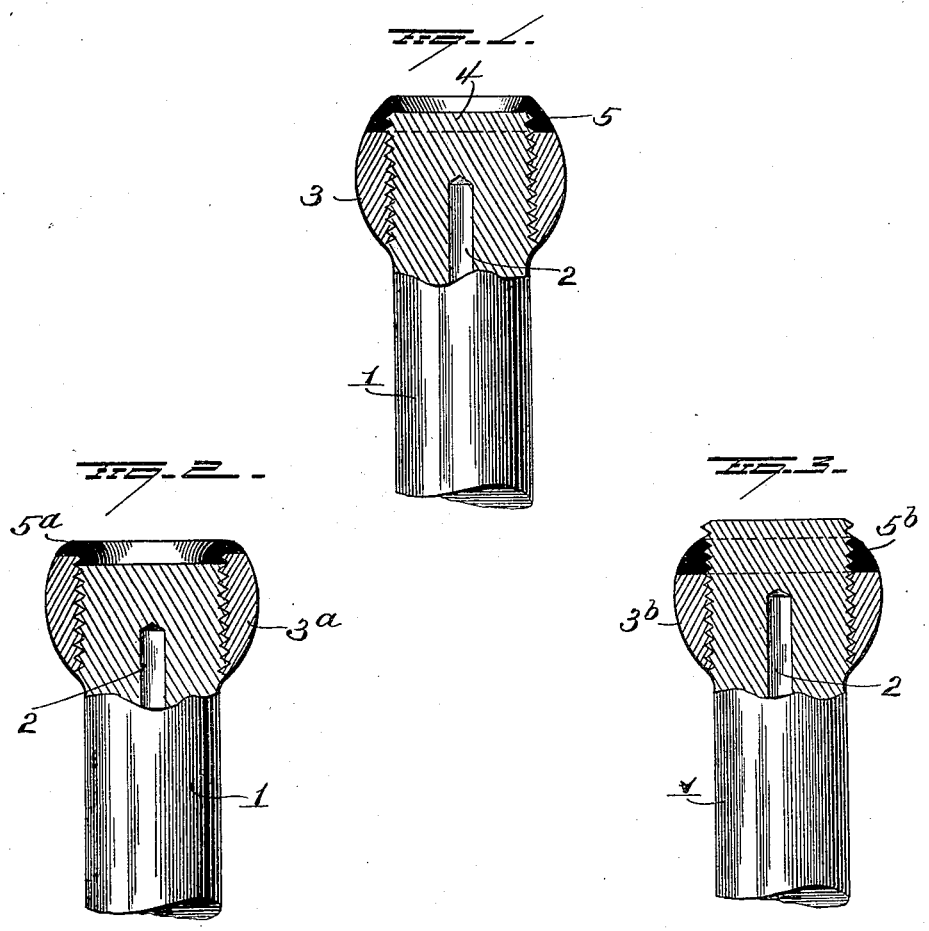
INVENTOR
F. K. Landgraf
By Seymour & Bright
Attorneys

UNITED STATES PATENT OFFICE.

FREDERICK K. LANDGRAF, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,410,480.   Specification of Letters Patent.   Patented Mar. 21, 1922.

Application filed July 2, 1919. Serial No. 308,127.

*To all whom it may concern:*

Be it known that I, FREDERICK K. LANDGRAF, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to an improvement in staybolt structures, and more particularly to the construction of the staybolt per se,—the object of the invention being to so construct a staybolt having a separately formed rounded head portion, that said head portion shall be effectually united to the body of the bolt and constitute an integral part thereof.

With this and other objects in view, the invention consists in certain novel features of construction and combinations of parts as hereinafter set forth and pointed out in the claims.

In the accompanying drawings, Figure 1 is a view illustrating one embodiment of my invention, and Figures 2 and 3 are views of modifications.

1 represents the body of a staybolt and the same may be provided with a tell-tale hole 2 which may extend from the inner end of the body of the bolt and terminate within the outer end portion of the latter.

The outer end portion of the bolt body is threaded to receive an internally threaded sleeve or nut 3 to form a head on the bolt. This sleeve or nut is made with a rounded outer contour so that the bolt may have a "flexible" connection with a boiler sheet.

In the embodiment of my invention shown in Figure 1, the sleeve or nut 3 is so threaded on the bolt body that a portion 4 of the latter will project beyond said sleeve or nut. An electric or oxy-acetylene weld will then be built up, with the use of suitable welding metal, on the outer end of the sleeve or nut and around the projecting portion 4 of the bolt and over the end of the bolt, as indicated at 5. The welding metal will become an integral part of the sleeve or nut and the bolt, and the union of these parts will be permanent.

In the form of the invention shown in Figure 2, the sleeve or nut $3^a$ is so screwed onto the end of the bolt body as to project slightly beyond the same, and the weld $5^a$ is so built up as to extend within the projecting portions of the sleeve or nut and united with a portion of the threaded interior thereof.

In the form of the invention shown in Figure 3, the sleeve or nut $3^b$ is made shorter than the sleeves or nuts 3, $3^a$, and is so threaded on the bolt that a considerable portion of the latter will project beyond said sleeve or nut. A weld $5^b$ is built up around the projecting threaded portion of the bolt and upon the outer end of the sleeve or nut,—the threaded portion of the bolt being permitted to extend beyond said weld.

It will be observed that in each of the figures of the drawing the sleeve or nut presents a spheroidal contour and thus the bolt is provided with a spheroidal head made separate from the body of the bolt and integrally united thereto so as to become an integral part thereof, by welding.

Having fully described my invention what I claim as new and desire to secure by Letters-Patent is:

1. A staybolt for boilers, comprising a body member, a spheroidal sleeve thereon forming a head, and a built-up weld coacting with both the sleeve and with the end portion of the body member and integrally uniting these parts.

2. A staybolt structure, comprising a body member having a threaded end portion, a spheroidal sleeve member threaded on said body member, one of said members projecting beyond the other, and a weld integrally uniting said members, said weld overlying the end of the body member and integral with the threaded portion of one of said members.

3. A staybolt structure, comprising a body member having a threaded end portion, a spheroidal sleeve member threaded on said body member, the body member projecting beyond one end of the sleeve member, and a weld integrally uniting said members, said weld surrounding the threaded projecting portion of the body member and extending from one end of the sleeve member and over the end of the body member.

In testimony whereof, I have signed this specification in the presence of two subscribing witnesses.

FREDERICK K. LANDGRAF.

Witnesses:
EDWIN S. RYCE,
F. H. ALLISON.